(12) United States Patent
Larosa et al.

(10) Patent No.: US 9,979,298 B2
(45) Date of Patent: May 22, 2018

(54) RECTIFIER BRIDGE CIRCUIT, CORRESPONDING APPARATUS AND METHOD

(71) Applicants: STMicroelectronics S.r.l., Agrate Brianza (IT); STMicroelectronics (Tours) SAS, Tours (FR)

(72) Inventors: Roberto Larosa, Viagrande (CT) (IT); Giulio Zoppi, Palermo (PA) (IT); Laurent Gonthier, Taipei (TW)

(73) Assignees: STMicroelectronics S.r.l., Agrate Brianza (IT); STMicroelectronics (Tours) SAS, Tours (FR)

( * ) Notice: Subject to any disclaimer, the term of this patent is extended or adjusted under 35 U.S.C. 154(b) by 0 days. days.

(21) Appl. No.: 15/157,711

(22) Filed: May 18, 2016

(65) Prior Publication Data
US 2017/0110970 A1 Apr. 20, 2017

(30) Foreign Application Priority Data
Oct. 15, 2015 (IT) .......................... 102015000062051

(51) Int. Cl.
*H02M 3/335* (2006.01)
*H02M 1/08* (2006.01)
(Continued)

(52) U.S. Cl.
CPC ......... *H02M 3/33507* (2013.01); *H02M 1/08* (2013.01); *H02M 1/081* (2013.01);
(Continued)

(58) Field of Classification Search
None
See application file for complete search history.

(56) References Cited

U.S. PATENT DOCUMENTS

| 4,161,011 A | 7/1979 | Wilkinson |
| 5,202,819 A * | 4/1993 | Min ..................... H02M 1/083 361/436 |

(Continued)

FOREIGN PATENT DOCUMENTS

| FR | 3013533 A1 | 5/2015 |
| GB | 2256757 A | 12/1992 |
| JP | S52149323 A | 12/1977 |

OTHER PUBLICATIONS

IT Search Report and Written Opinion for IT 102015000062051 dated Jun. 6, 2016 (8 pages).

*Primary Examiner* — Jeffrey Gblende
(74) *Attorney, Agent, or Firm* — Crowe & Dunlevy

(57) ABSTRACT

A rectifier bridge circuit includes a first SCR/IGBT switch and a second SCR/IGBT switch coupled to a circuit input to receive an ac input voltage. The first and second SCR/IGBT switches are alternatively switchable to generate a rectified voltage at a circuit output. Control currents coupled to control terminals of the first and second SCR/IGBT switches are power supply sourced from an auxiliary dc source generated by rectifying the ac input voltage. The control currents are generated by current sources coupled between the auxiliary dc source and the control terminals of the first and second SCR/IGBT switches. The current sources are selectively activatable to produce gating currents for switching on and off the first and second SCR/IGBT switches. A controller unit is provided to control the current sources via level shifter circuits. The control implements progressive conduction time of the first and second SCR/IGBT switches so as to provide inrush current limitation.

33 Claims, 3 Drawing Sheets

(51) Int. Cl.
*H02M 1/42* (2007.01)
*H02M 1/36* (2007.01)
*H02M 7/12* (2006.01)
H02M 7/06 (2006.01)
H02M 1/00 (2006.01)

(52) U.S. Cl.
CPC ............... *H02M 1/36* (2013.01); *H02M 1/42* (2013.01); *H02M 7/125* (2013.01); *H02M 7/062* (2013.01); *H02M 2001/0006* (2013.01)

(56) References Cited

U.S. PATENT DOCUMENTS

| | | | | |
|---|---|---|---|---|
| 5,822,203 | A * | 10/1998 | Peron | H02M 1/083 323/908 |
| 6,493,245 | B1 | 12/2002 | Phadke | |
| 2004/0120089 | A1* | 6/2004 | Temesi | H02M 7/125 361/93.1 |
| 2006/0274468 | A1* | 12/2006 | Phadke | H02M 7/125 361/93.1 |
| 2012/0230075 | A1* | 9/2012 | Lee | H02M 1/36 363/128 |
| 2015/0180329 | A1* | 6/2015 | Yoshino | H02M 3/33546 363/21.04 |

* cited by examiner

RECTIFIER BRIDGE CIRCUIT, CORRESPONDING APPARATUS AND METHOD

PRIORITY CLAIM

This application claims priority from Italian Application for Patent No. 102015000062051 filed Oct. 15, 2015, the disclosure of which is incorporated by reference.

TECHNICAL FIELD

The description relates to controlled rectifier bridge circuits.

One or more embodiments may find use in a variety of applications such as: single-phase motor control, three-phase motor inverters, switched mode power supplies—SMPS's (e.g. for computers, telecom, etc.), and automotive sector.

BACKGROUND

Controlled bridges may permit to enable a load when an event occurs and to implement a soft-start process by controlling the inrush current.

Controlled bridges may be implemented in a number of ways such as, e.g.: electromechanical solutions using relays, electronic solutions using silicon-controlled rectifiers—e.g. SCRs.

Electromechanical solutions may use a relay to implement both event load enabling and soft-start.

For instance, in such a solution load enabling may be achieved by driving a first switch having cascaded a parallel connection of a second switch and a resistor to implement the inrush current control. The resistor may limit the current that tends to flow into a capacitor while charged. Such a capacitor may have a high capacitance value and the inrush current would tend to have a high value as well. Once the capacitor is well charged the resistor is no longer useful and may be shorted by the second switch to avoid power losses that would adversely affect efficiency. An auxiliary power supply (e.g. a SMPS) and a micro controller unit (MCU) may be required in order to drive the two switches.

While offering some advantages (e.g. galvanic isolation), such a solution may exhibit various drawbacks, e.g.: high cost (relays used as switches and sense resistors may be expensive), poor reliability (relay operation lifetime and reliability may be low in comparison with electronic devices), risk of undesired relay opening due to e.g. vibrations, explosion hazard in flammable environment, acoustic noise, and high current consumption to drive the relay coil.

Other than for those cases where galvanic isolation is an asset, these drawbacks may suggest to refer to electronic solutions e.g. including SCRs.

These solutions may still exhibit certain drawbacks such as e.g.: increased design complexity and cost due e.g. to the possible use of a floating supply, if a floating supply is not used, dedicated opto- or magnetic couplers for the SCR control may be used, which however has an impact on the overall cost. Further, these solutions may not be friendly in terms of back-compatibility (e.g. as these may involve redesigning magnetics for existing designs not intended to be controlled).

There is a need in the art to provide an improved solution dispensing with at least some, and notionally all, of the drawbacks outlined in the foregoing.

SUMMARY

According to one or more embodiments, a rectifier bridge circuit is provided.

One or more embodiments may also relate to corresponding apparatus (e.g. single-phase motor control apparatus, three-phase motor inverter apparatus, SMPS's for computers, telecom, automotive applications) as well as to a corresponding method.

One or more embodiments may provide a rectifier bridge with electronics switches (e.g. conventional SCRs) biased from an auxiliary DC bus and interfaced with a microcontroller unit—MCU without the need of any magnetic or opto-couplers.

One or more embodiments may provide a rectifier bridge embedding two electronics switches (e.g. conventional SCRs), controllable by a positive gating current sourced by an auxiliary DC bus voltage.

One or more embodiments may provide, possibly in combination with the foregoing, a circuit architecture using an auxiliary DC bus to provide a positive control current to an electronic switch (such as e.g. a SCR or IGBT) implemented with essentially one diode and a high-voltage low-valued capacitor.

One or more embodiments may provide a circuit architecture controllable with low-cost high-voltage transistors driven from a MCU thus dispensing with expensive opto- or magnetic couplers.

One or more embodiments may provide a circuit with an inrush current limitation facilitated by progressive time conduction of the electronic switches (e.g. SCRs).

One or more embodiments may include a level shifter/current source circuit that allows the electronic switches to be properly biased from an auxiliary DC voltage bus and directly interfaced with a MCU without resorting e.g. to opto-couplers.

One or more embodiments may offer one or more of the following advantages: a floating supply and/or opto- or magnetic couplers may be dispensed with; friendliness in terms of back compatibility (e.g. no need to redesign magnetics or power supply stages); reduced cost due to just one diode and one high-voltage capacitor used in a low cost topology; and possibility of using standard, conventional electronic switches such as e.g. SCRs, IGBTs, MOSFETs, or triacs.

BRIEF DESCRIPTION OF THE DRAWINGS

One or more embodiments will now be described, by way of example only, with reference to the annexed figures, wherein.

DETAILED DESCRIPTION

Figure 1:
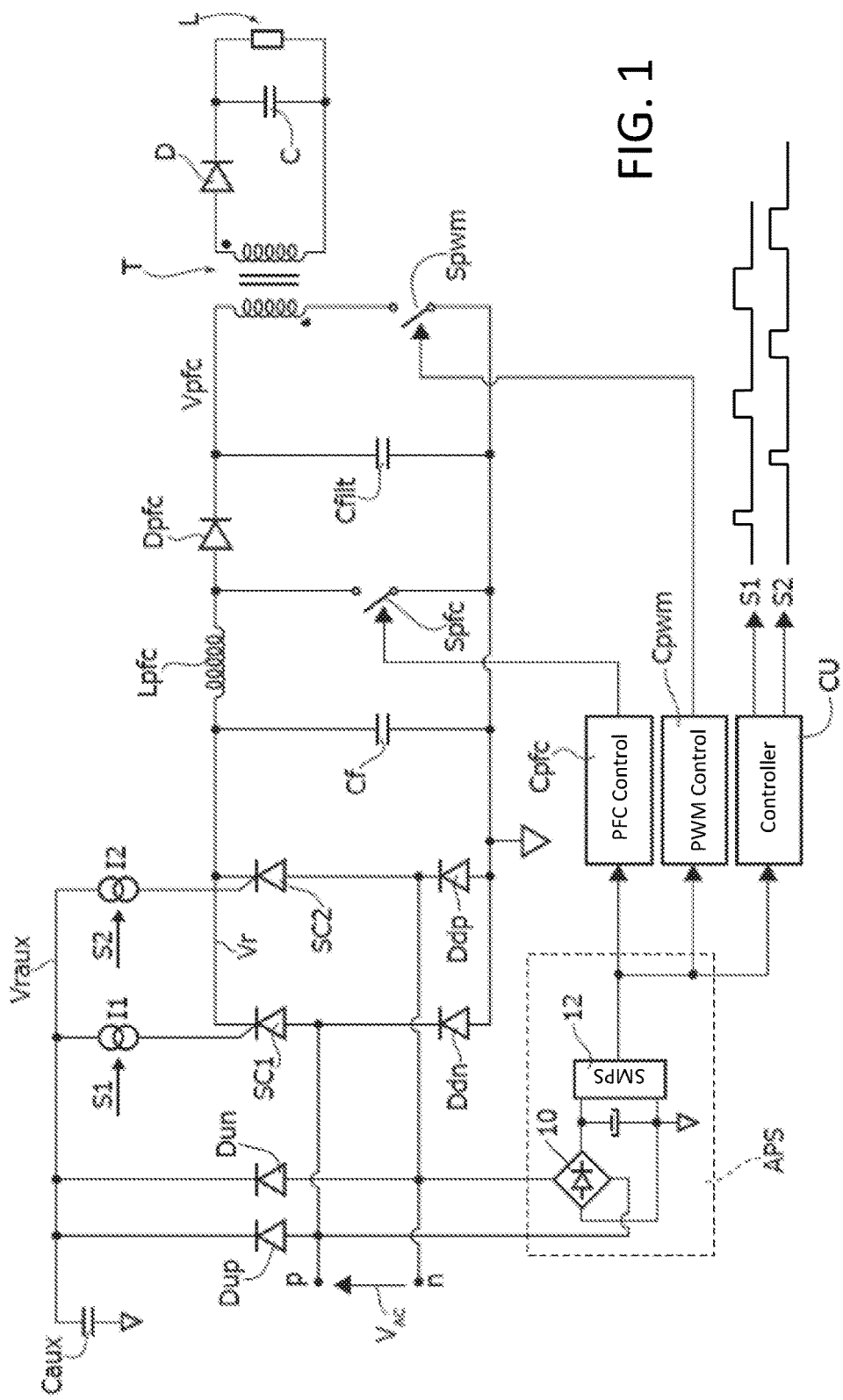
FIG. 1 is a circuit diagram.

In the ensuing description, one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

The principles of operation and design of rectifier bridge circuits are known in the art, thus making it unnecessary to provide a detailed description herein.

Reference may be had in that respect e.g. to documents such as U.S. Pat. No. 5,822,203 (incorporated by reference) which discloses an arrangement exhibiting stand-by losses due to resistors of the active path and a complex analog circuitry not controllable by e.g. a MCU, U.S. Pat. No. 4,161,011 (incorporated by reference) which again exhibits stand-by losses due to resistors in the active path and may not work for a capacitive output, or U.S. Pat. No. 6,493,245 (incorporated by reference) which requires an auxiliary power supply and opto-couplers and once more exhibits stand-by losses.

These solutions may include e.g. a rectifier bridge with SCRs to drive a power factor control—PFC stage followed by a flyback DC-DC SMPS. In such configurations, an auxiliary power supply SMPS may bias a microcontroller unit. This may in turn drive two switches to source current into e.g. the gate of a conventional SCR in order to enable current conduction from anode to cathode. If the two switches are open and no current is injected into the gate of the SCRs, the load is disconnected. Properly switching on and off the two switches may permit to achieve inrush current control. In one or more embodiments, a rectifier bridge circuit as exemplified in the figures may be intended to be fed with an input ac voltage $V_{AC}$ and to provide a (rectified) output voltage Vout to a load L, e.g. of a resistive type, via a transformer T.

The load L (which per se may not be a part of the embodiments) may be coupled to the secondary winding of the transformer via a rectifier diode and a "smoothing" capacitor C.

One or more embodiments as exemplified in the figures may include a (full-wave) rectifier bridge including four diodes Dup, Dun, Ddp and Ddn to derive a rectified auxiliary dc voltage Vraux from the input ac voltage $V_{AC}$.

The diodes Dup, Dun, and the node at which the voltage Vraux is present (hereinafter, the node Vraux), may be regarded as loaded "lightly" insofar as they do not interface (directly) with the circuit load L.

This is in contrast to the node Vr to which two electronic switches SC1 and SC2 may be connected, e.g. with the switches SC1 and SC2 coupled to the one and the other of the input terminals p and n which receive the input ac voltage $V_{AC}$ with the diodes Ddp and Ddn "shared" between a high power circuit, when current flows also through the two electronic switches SC1 and SC2 SCR, and a low power circuit when the current flows through the two Dup and Dun diodes (exemplary current paths may be: Dup→Ddp, Dun→Ddp when the switches are off and Dup+SC1→Ddp and Dun+SC2→Ddp when the switches are on.

While SCRs will be primarily referred to in the following as exemplary of such electronic switches SC1, SC2, other types of electronic switches (e.g. triacs with a current sourced to the gate; IGBTs or MOSFETs, as detailed in the following e.g. in connection with FIG. 2) may be used in one or more embodiments.

In one or more embodiments, the SCRs which implement the switches SC1 and SC2 may be arranged with their cathodes coupled to the node Vr and their anodes coupled the input terminals which receive the input ac voltage $V_{AC}$.

Also, the switches SC1 and SC2 may have their control electrodes (e.g. gates or bases) coupled to two respective current sources I1 and I2 acting between the node Vraux and the switches S1 and S2.

The node Vr may coupled e.g. via an inductor Lpfc and a diode Dpfc (to be discussed in the following) to the primary winding of the transformer T to provide thereto a voltage Vpfc.

The node Vr may thus be regarded as "heavily loaded", and thus exposed to drop down having as a result that at a certain point, depending on e.g. the load, Vraux may be higher than Vr allowing enough headroom for the current sources I1 and I2 to source a gating current to latch the SCRs, e.g. SC1 and SC2. Such a gating current may be provided by a capacitor Caux coupled to the node Vaux.

In one or more embodiments, the current sources I1 and I2 may be driven (enabled) via two signals S1 and S2 from a controller unit CU (e.g. a microcontroller unit—MCU), so that the voltage at the node Vraux will momentarily drop down and recover back at the peak of the ac input voltage once the SCRs SC1 and SC2 get latched.

The amount of voltage drop depends on the capacitance of the capacitor Caux, which in turn may be selected as a function of the amount of the control current needed to latch the SCRs, SC1, SC2 used.

In one or more embodiments an inrush current limitation function may thus be implemented by progressive (e.g. increasing) conduction time of the SCRs, SC1, SC2.

In one or more embodiments an auxiliary dc supply (which in fact may act as a floating supply) may be produced by just using the diodes Dup, Dun and the capacitor Caux, thus avoiding redesigning the magnetics of the power supply apparatus.

This may facilitate saving on components.

In one or more embodiments, only one of the diodes Dup or Dun may be retained to charge the capacitor Caux, e.g. by doubling the capacitance value of the capacitor Caux.

Using, in one or more embodiments, both diodes Dup and Dun may facilitate obtaining a symmetric structure.

In one or more embodiments, a controlled rectifier bridge circuit as exemplified herein may include a power factor control—PFC function including e.g. a switch Spfc acting between the intermediate point of the inductor Lpfc and the diode Dpfc and a line coupled to the anodes of the diodes Ddn and Ddp.

In one or more embodiments, the output voltage of the PFC circuitry may be boosted to a value higher than the highest input voltage. For instance, in the case of a 220V ac input voltage, the output voltage of the PFC circuitry may be boosted at e.g. 400V dc.

In one or more embodiments as exemplified herein, the arrangement including the switch Spfc, the inductor Lpfc and the diode Dpfc may be set between:
   a first capacitor Cf set between the cathodes of the SCRs SC1 and SC2 and the anodes of the diodes Ddn and Ddp, and
   a second filtering capacitor Cfilt set between the terminal of the diode Dpfc coupled to primary winding of the transformer T and the line coupled to the anodes of the diodes Ddn and Ddp.

A further switch Spwm may be arranged to control current flow through the primary winding of the transformer T in order to implement a flyback dc-dc SMPS function.

Operation of the switches Spfc and Spwm may be under the control of respective controllers Cpfc and Cpwm operating e.g. as PFC pwm (pulse width modulation) controller and as SMPS pwm controller.

While depicted here separately from the controller CU which generates the signals S1, S2 to control the current sources I1 and I2, in one or more embodiments one or both of the controllers Cpfc and Cpwm may be incorporated to the controller CU.

Whatever the arrangements adopted in that respect, an auxiliary power supply APS (including e.g. a bridge circuit 10 and a SMPS 12) may be provided to feed the controllers CU, Cpfc, Cpwm.

Operation of the power factor control/flyback dc-dc SMPS function circuitry just described is conventional in the art, which makes it unnecessary to provide a more detailed description herein.

Figure 2:
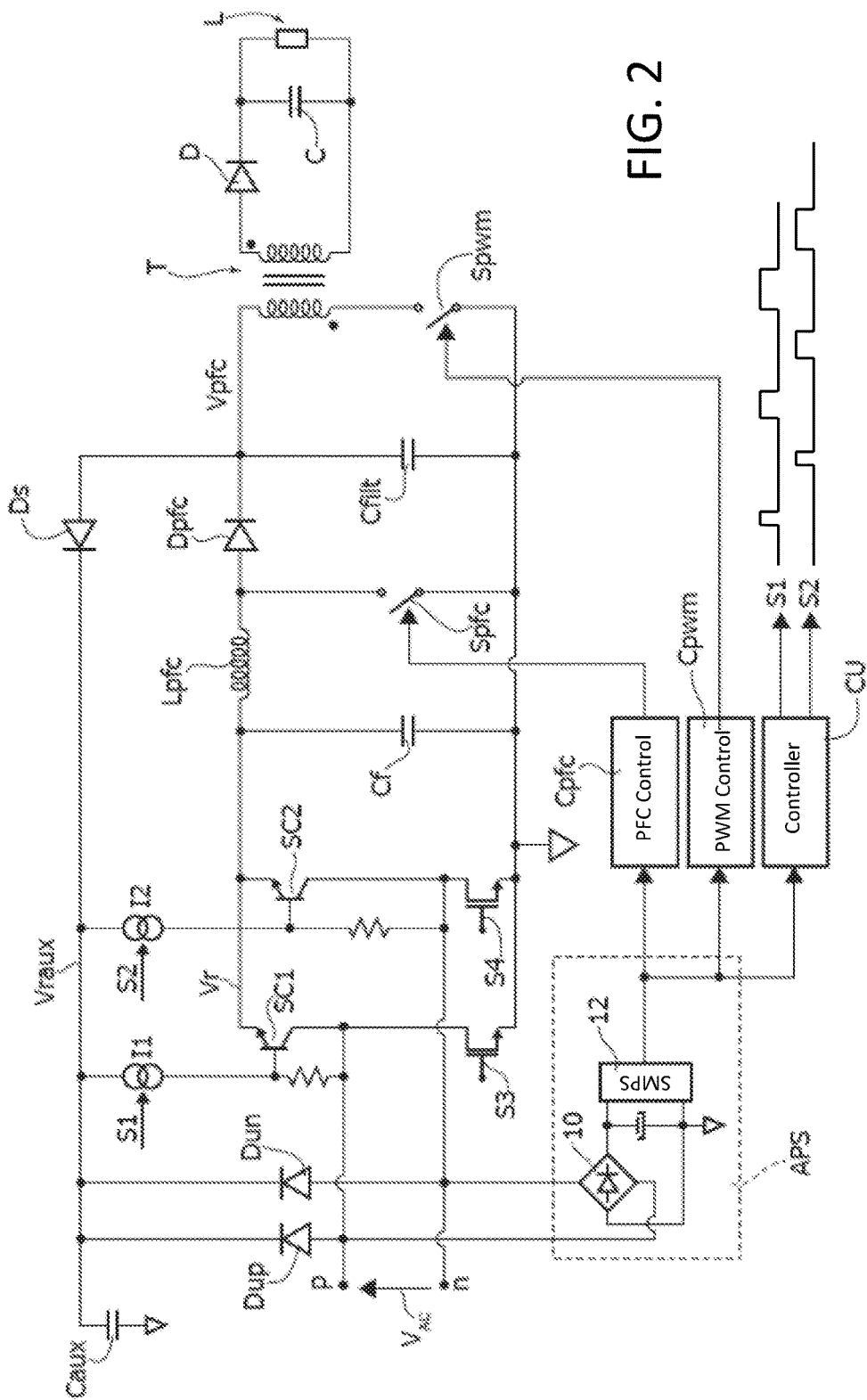
FIG. 2 is a circuit diagram.

FIG. 2 is exemplary of a number of features which may be adopted, individually or in combination, in one or more embodiments, e.g.:
- a diode Ds to transfer the voltage Vpfc to the node Vraux,
- switches SC1, SC2 implemented using IGBTs,
- active switches such as Nmos used in the place of the diodes Ddn and Ddp.

While illustrated together in FIG. 2 for the sake of simplicity, one or more embodiments may adopt these features independently and/or in different possible combinations with each other.

For instance, just by way of non-limiting examples:
- one or more embodiments may include a diode Ds to transfer the voltage Vpfc to the node Vraux (as shown in FIG. 2) with switches SC1, SC2 implemented as SCRs (as shown in FIG. 1);
- one or more embodiments may include switches SC1, SC2 implemented as IGBTs (as shown in FIG. 2) without including a diode Ds to transfer the voltage Vpfc to the node Vraux (as is the case in FIG. 1);
- one or more embodiments may include switches SC1, SC2 implemented as IGBTs (as shown in FIG. 2) with diodes Ddn and Ddp (as shown in FIG. 1);
- one or more embodiments may include switches SC1, SC2 implemented as SCRs (as shown in FIG. 1) with active switches such as Nmos used in the place of the diodes Ddn and Ddp (as shown in FIG. 2).

Also, in one or more embodiments, MOSFETs or triacs may be used in the place of SCRs or IGBTs in order to implement controllable switches SC1, SC2.

The possible provision of the diode Ds exemplified in FIG. 2 may take into account the fact that in a PFC arrangement the voltage Vpfc, in steady state condition, may be higher than Vr.

In one or more embodiments, the diode Ds may be set between the node Vraux and the line to the primary winding of the transformer where the voltage Vpfc is present, e.g. with the cathode of Ds coupled to the node Vraux and the anode of Ds coupled with Vpfc in order to transfer the voltage Vpfc towards the node Vraux.

As indicated, in one or more embodiments, the output voltage of the PFC circuitry may be boosted to a value higher than the highest input voltage. Save for the (in fact negligible) difference given by the diode drop across Ds, in one or more embodiments Vraux may be steadily quite higher than Vr. This facilitates having, even with discontinuous mode PFC, enough voltage headroom between Vraux and Vr to source the current into e.g. the gates of the SCRs SC1 and SC2.

FIG. 2 illustrates by way of example switches SC1, SC2 implemented by means of (e.g. npn) IGBTs arranged with their emitters coupled to the node Vr and their collectors coupled the input terminals which receive the input ac voltage $V_{AC}$.

Also, the switches SC1 and SC2 may have their control electrodes (here, their bases) coupled to the respective current sources I1 and I2 acting between the node Vraux and the switches S1 and S2 (this arrangement may include e.g. bias resistors between the bases of the IGBTs and the p and n input terminals to which the input voltage $V_{AC}$ is applied).

Such embodiments retain both functions of load enabling and inrush current control.

Also, in one or more embodiments, the availability of the digital control provided by the MCU (e.g. signals S1 and S2) makes it possible to replace the diodes Ddn and Ddp with two electronic switches S3, S4 (e.g. Nmos) actuated—that is turned on and off—by the controller unit CU, which may facilitate reducing losses in comparison with diodes and increasing the efficiency of the converter.

One or more embodiments may thus provide a circuit topology where two "high side" switches (SC1, SC2—however implemented: SCRs, IGBTs, . . . ) can be controlled via a current sourced from a high-voltage DC auxiliary bus.

Figure 3:
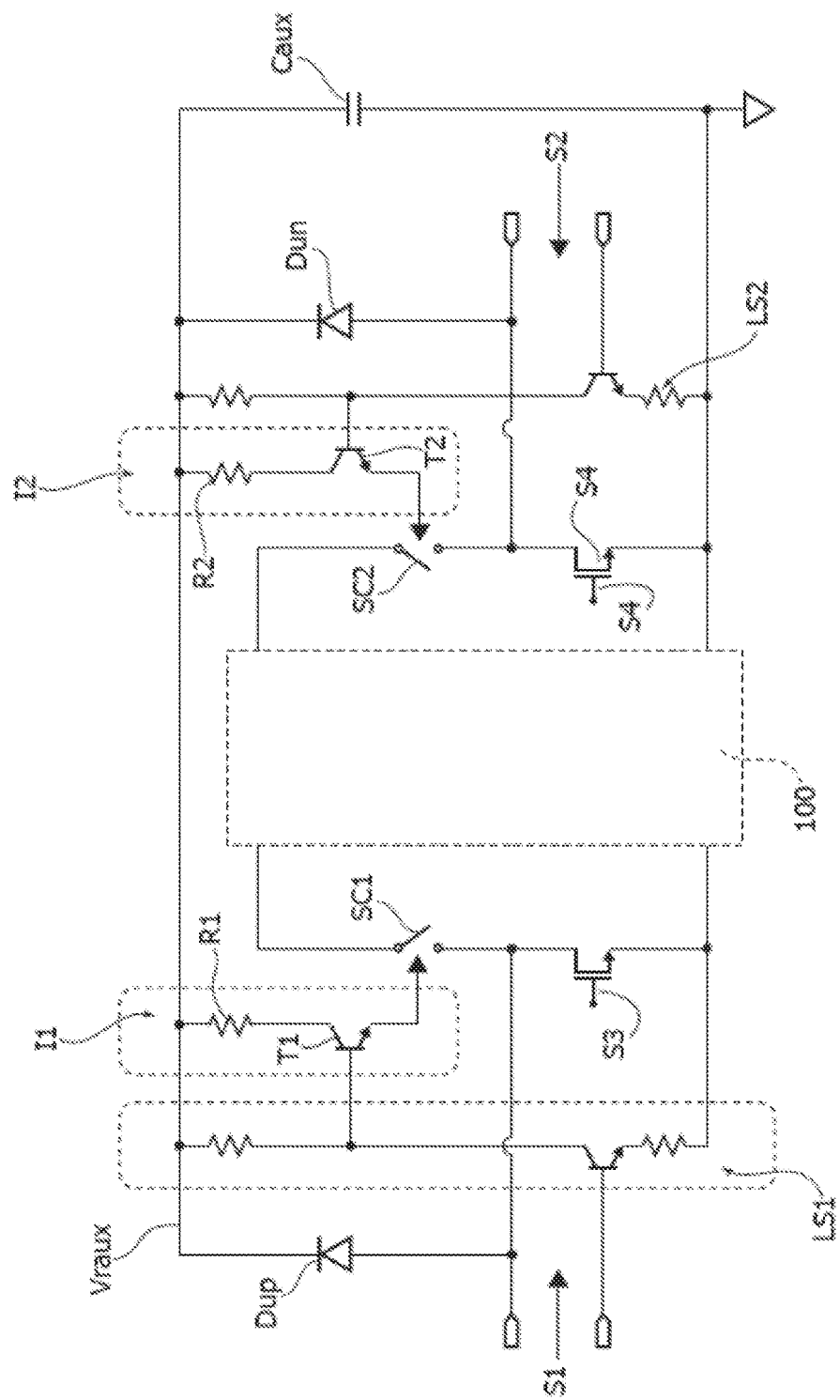
FIG. 3 is circuit diagram.

Whatever specific options may be adopted in respect of the various features discussed in the foregoing, in one or more embodiments, the current sources indicated as I1 and I2 in FIGS. 1 and 2 coupled to the switches SC1 and SC2 (however implemented) may include e.g. an emitter-degenerated high-voltage e.g. p-n-p bipolar transistors T1, T2 as schematically shown in FIG. 3.

In FIG. 3 the same reference symbols have been used to indicate parts or elements already discussed in connection with FIGS. 1 and 2.

A corresponding description will not be repeated here for the sake of brevity. Also, for the sake of simplicity of representation, various components coupled with the outputs of the electronic switches S1 and S2 as detailed in FIGS. 1 and 2 are schematically represented as a single block 100 in FIG. 3.

In one or more embodiments, as exemplified in FIG. 3, the current sources I1 and I2 (e.g. the transistors T1 and T2) may be driven via e.g. transistor-based level shifters LS1 and LS2.

By using a level shifter/current source arrangements as exemplified in FIG. 3, the electronic switches SC1, SC2 (e.g. SCRs or IGBTs) can be directly interfaced with the controller unit CU, e.g. by coupling the signals S1 and S2 to the inputs of the level shifters LS1 and LS2.

This makes it possible e.g. to dispense with expensive opto- or magnetic couplers.

Also, it will be appreciated that, in one or more embodiments as exemplified herein, the value of the control (e.g. gate or base) currents I1, I2 will not depend on the amplitude of the input voltage Vac, and may determined (solely) by the value of the bias supply of the controller CU together with the value of the degenerating resistors R1, R2, thus leading to a topology which may be compliant with a wide range of voltages (e.g. Vac 110-230 V).

In one or more embodiments, by using degenerated BJTs, the current may be well defined by the value of the resistors. For instance, the value of the current through the transistors may be given by Inpn=(Vbias_mcu−0.7V)/Rpn, where Rpn is the resistance value of the emitter degeneration resistor of the e.g. npn transistor T1, T2. The current Inpn may create a voltage drop in the resistor (having a resistance value Rup) coupled between the voltage Vraux and the base of the BJT transistor so that the control current Igate in the switches SC1, SC2 may be expressed as Igate=(Inpn*Rup−0.7V)/Rnpn--->((Vbias_mcu−0.7V)/Rnpn)*Rup−0.7V)/Rnpn.

It will be similarly appreciated that one or more embodiments as exemplified herein may result in just a pair of resistors being added to existing topologies already including a pair of switches.

It will otherwise be appreciated that, in one or more embodiments, the polarities of certain voltages (e.g. Vpfc, Vout) may be reversed with respect to those exemplified herein (e.g. negative instead of positive). This may result in the polarities of certain components being correspondingly reversed (e.g. diode anode and cathode placement reversed in comparison with the placement exemplified herein).

One or more embodiments may thus implement a rectifier bridge circuit, including:
  a first electronic switch SC1 and a second electronic switch SC2, e.g. SCRs or IGBTs (or possibly MOSFETs or triacs), having control terminals (e.g. gates or bases for field effect and bipolar transistors, respectively), the electronic switches SC1, SC2 coupled to a circuit input to receive an ac input voltage $V_{AC}$ and alternatively switchable on and off to provide a rectified voltage at a circuit output,
  an auxiliary dc source (e.g. Caux, Dup, Dun) to provide control currents I1, I2 to the control terminals of the electronic switches SC1, SC2.

In one or more embodiments, the auxiliary dc source may include a capacitor Caux coupled to the circuit input via at least one, optionally even just one, diode Dup to be charged by the ac input voltage $V_{AC}$.

In one or more embodiments, the capacitor Caux in the auxiliary dc source may be coupled to the circuit input via a pair of diodes Dup, Dun in a symmetric arrangement, with the pair of diodes Dup, Dun optionally included in a full-wave (e.g. Graetz) rectifier bridge set between the circuit input and the electronic switches SC1, SC2.

In one or more embodiments, a rectifier bridge circuit may include current sources I1, I2, optionally implemented as emitter-degenerated bipolar transistors T1, T2, with these current sources I1, I2 set between the auxiliary dc source (e.g. Caux, Dup, Dun) and the control terminals of the electronic switches SC1, SC2, the current sources I1, I2 being selectively activatable, e.g. via signals S1, S2 from a (micro)controller CU to produce a gating current for switching on and off the electronic switches SC1, SC2.

One or more embodiments may include a controller unit CU to selectively activate the current sources I1, I2, with the controller unit CU optionally configured to implement progressive (that is, increasing) conduction times of the electronic switches SC1, SC2 thereby providing inrush current limitation.

One or more embodiments may include level shifters LS1, LS2 set between the auxiliary dc source (e.g. Caux, Dup, Dun) and the current sources I1, I2, so that the electronic switches SC1, SC2 may be biased from the auxiliary dc source.

In one or more embodiments, the level shifters LS1, LS2 may be (directly) coupled to the controller unit CU to be driven thereby.

One or more embodiments may include power factor control circuitry coupled to the electronic switches SC1, SC2 to provide a power factor controlled voltage; a diode Ds may thus be set between the power factor controlled line and the auxiliary dc source to transfer the power factor controlled voltage Vpfc to the auxiliary dc source.

Without prejudice to the underlying principles, the details and embodiments may vary, even significantly, with respect to what has been described by way of example only without departing from the extent of protection.

The extent of protection is defined by the annexed claims.

The invention claimed is:

1. A rectifier bridge circuit, comprising:
   a first electronic switch having a control terminal,
   a second electronic switch having a control terminal,
   wherein the first and second electronic switches are coupled to a circuit input configured to receive an ac input voltage, said first and second electronic switches being alternatively switchable on and off to provide a rectified voltage at a circuit output, and
   an auxiliary dc source circuit configured to provide a first control current from an auxiliary supply node to the control terminal of the first electronic switch and provide a second control current from said auxiliary supply node to the control terminal of the second electronic switch, said auxiliary dc source circuit comprising a capacitor having a first terminal directly connected to said auxiliary supply node and a second terminal directly connected to a ground node.

2. The rectifier bridge circuit of claim 1, wherein the auxiliary supply node is connected to the circuit input via at least one diode operating to charge said capacitor by said ac input voltage.

3. The rectifier bridge circuit of claim 2, wherein the auxiliary supply node is connected to the circuit input via a pair of diodes, said pair of diodes being components of a full-wave rectifier bridge coupled between the circuit input and anode terminals of the first and second electronic switches.

4. The rectifier bridge circuit of claim 1, further including first and second current sources implemented as emitter-degenerated bipolar transistors, the first and second current sources coupled between the auxiliary supply node and the respective control terminals of the first and second electronic switches, wherein said first and second current sources are selectively activatable to produce a gating current for switching on and off the first and second electronic switches.

5. The rectifier bridge circuit of claim 4, further including a controller circuit configured to selectively activate said first and second current sources, the controller circuit configured to progressively increase conduction times during which the first and second electronic switches are switched on thereby providing inrush current limitation.

6. The rectifier bridge circuit of claim 5, further including first and second level shifters coupled between the auxiliary dc source circuit and the first and second current sources, respectively, wherein the first and second electronic switches are biased from the auxiliary dc source circuit.

7. The rectifier bridge circuit of claim 6, wherein the first and second level shifters are configured to be driven by the controller circuit.

8. The rectifier bridge circuit of claim 1, further including:
   a power factor control circuit coupled to provide a power factor controlled voltage over a power factor controlled line,
   a diode coupled between the power factor controlled line and the auxiliary supply node to transfer the power factor controlled voltage to said capacitor at the auxiliary supply node.

9. The rectifier bridge circuit of claim 1, wherein the first and second electronic switches each comprise SCRs.

10. The rectifier bridge circuit of claim 1, wherein the first and second electronic switches each comprise IGBTs.

11. A circuit, comprising:
a pair of ac input nodes;
a first SCR switch having an anode coupled to a first node of the pair of ac input nodes and a cathode coupled to a first output node;
a second SCR switch having an anode coupled to a second node of the pair of ac input nodes and a cathode coupled to the first output node;
a first current source generating a first current applied to a control node of the first SCR switch to turn on the first SCR switch;
a second current source generating a second current applied to a control node of the second SCR switch to turn on the second SCR switch;
wherein the first and second current sources are supplied power from a dc power supply node;
an auxiliary dc source circuit input from the pair of ac input nodes and configured to generate a dc supply voltage at said dc power supply node, wherein said auxiliary dc source circuit comprises a first diode coupled between the first node of the pair of ac input nodes and said dc power supply node and a second diode coupled between the second node of the pair of ac input nodes and said dc power supply node;
a first transistor having a source-drain path between the anode of the first SCR switch and a second output node;
a second transistor having a source-drain path between the anode of the second SCR switch and the second output node; and
a control circuit configured to generate first and second control signals for controlling actuation of the first and second current sources and further configured to generate third and fourth control signals for controlling actuation of the first and second transistors.

12. The circuit of claim 11, wherein said first and second diodes are components of a rectifier bridge circuit which includes a third diode coupled between the anode of the first SCR switch and a second output node and a fourth diode coupled between the anode of the second SCR switch and the second output node.

13. The circuit of claim 11, further comprising a control circuit configured to generate first and second control signals for controlling actuation of the first and second current sources so as to implement a progressive increase in conduction times during which the first and second SCR switches are turned on to provide inrush current limitation.

14. The circuit of claim 11, further comprising a diode having an anode coupled to the output node and a cathode coupled to the dc power supply node.

15. The circuit of claim 11, further comprising a power factor correction circuit coupled between the cathodes of the first and second SCR switches and the first output node.

16. The circuit of claim 11, further comprising a transformer having a primary winding coupled in series with a switching circuit to the first output node, wherein a secondary winding of the transformer is configured to supply a load circuit.

17. A rectifier bridge circuit, comprising:
a first electronic switch having a control terminal,
a second electronic switch having a control terminal,
wherein the first and second electronic switches are coupled to a circuit input configured to receive an ac input voltage, said first and second electronic switches being alternatively switchable on and off to provide a rectified voltage at a circuit output,
an auxiliary dc source circuit comprising:
a first current source implemented as an emitter-degenerated bipolar transistor configured to provide a first control current to the control terminal of the first electronic switch; and
a second current source implemented as an emitter-degenerated bipolar transistor configured to provide a second control current to the control terminal of the second electronic switch,
wherein said first and second current sources are selectively activatable to produce a gating current for switching on and off the first and second electronic switches.

18. The rectifier bridge circuit of claim 17, wherein the auxiliary dc source circuit further includes a capacitor coupled to the circuit input via at least one diode to be charged by said ac input voltage.

19. The rectifier bridge circuit of claim 18, wherein the capacitor of the auxiliary dc source circuit is coupled to the circuit input via a pair of diodes, said pair of diodes being components of a full-wave rectifier bridge coupled between the circuit input and anode terminals of the first and second electronic switches.

20. The rectifier bridge circuit of claim 17, further including a controller circuit configured to selectively activate said first and second current sources, the controller circuit configured to implement a progressive increase in conduction times during which the first and second electronic switches are turned on.

21. The rectifier bridge circuit of claim 20, further including first and second level shifters configured to level shift control signals for selectively activating said first and second current sources.

22. The rectifier bridge circuit of claim 21, wherein the first and second level shifters are configured to be driven by the controller circuit.

23. The rectifier bridge circuit of claim 17, wherein the first and second electronic switches each comprise SCRs.

24. The rectifier bridge circuit of claim 17, wherein the first and second electronic switches each comprise IGBTs.

25. A rectifier bridge circuit, comprising:
a first electronic switch having a control terminal,
a second electronic switch having a control terminal,
wherein the first and second electronic switches are coupled to a circuit input configured to receive an ac input voltage, said first and second electronic switches being alternatively switchable on and off to provide a rectified voltage at a circuit output,
an auxiliary capacitor having a first terminal connected to an auxiliary supply node and a second terminal connected to a ground node,
a charging circuit configured to charge the auxiliary capacitor from the ac input voltage,
a first current source powered from the auxiliary supply node and configured to provide a first control current to the control terminal of the first electronic switch, and
a second current source powered from the auxiliary supply node and configured to provide a second control current to the control terminal of the second electronic switch.

26. The rectifier bridge circuit of claim 25, wherein the charging circuit comprises at least one diode connected between the circuit input and the auxiliary supply node.

27. The rectifier bridge circuit of claim 25, wherein the charging circuit comprises a pair of diodes that are components of a full-wave rectifier bridge and are coupled between the circuit input and the auxiliary supply node.

28. The rectifier bridge circuit of claim 25, wherein the first and second current sources are implemented as emitter-degenerated bipolar transistors.

29. The rectified bridge circuit of claim 25, wherein the first and second current sources are selectively activatable to produce a gating current for switching on and off the first and second electronic switches.

30. The rectifier bridge circuit of claim 29, further including a controller circuit configured to selectively activate said first and second current sources using first and second control signals, respectively.

31. The rectifier bridge circuit of claim 30, further including first and second level shifters configured to level shift the first and second control signals.

32. The rectifier bridge circuit of claim 25, wherein the first and second electronic switches each comprise SCRs.

33. The rectifier bridge circuit of claim 25, wherein the first and second electronic switches each comprise IGBTs.

* * * * *